United States Patent [19]

Albertini et al.

[11] Patent Number: 4,616,590

[45] Date of Patent: Oct. 14, 1986

[54] ACOUSTICAL MOORING RELEASE SYSTEM

[75] Inventors: Rocco D. Albertini, Concordville, Pa.; Ralph E. Clements, Katy, Tex.; Thomas V. Grzeczkowski, Ridley Park, Pa.

[73] Assignee: Baldt Incorporated, Chester, Pa.

[21] Appl. No.: 607,760

[22] Filed: May 7, 1984

[51] Int. Cl.[4] .......... F16G 15/04

[52] U.S. Cl. .......... 114/230; 114/293; 59/85

[58] Field of Search .......... 59/84–86; 114/293, 294, 230, 221 A; 89/1 B, 1 F; 102/418, 416, 406, 211

[56] References Cited

U.S. PATENT DOCUMENTS

| | | | |
|---|---|---|---|
| 785,881 | 3/1905 | Hill | 59/85 |
| 3,572,244 | 3/1971 | Garber | 102/418 |
| 3,905,190 | 9/1975 | Pearlman | 59/93 |
| 4,033,277 | 7/1977 | Schaper | 114/230 |
| 4,067,282 | 1/1978 | Guinn et al. | 114/230 |
| 4,185,553 | 1/1980 | Houser | 102/418 |
| 4,207,623 | 6/1980 | Anderson | 102/418 |

OTHER PUBLICATIONS

"Baldt Anchor/Mooring Systems for . . . Platforms" Baldt Inc., Chester Pa. 19016, 1978.

*Primary Examiner*—Galen L. Barefoot

*Assistant Examiner*—C. T. Bartz

*Attorney, Agent, or Firm*—Cushman, Darby & Cushman

[57] ABSTRACT

A semi-submersible drilling rig or the like having a plurality of chain lockers, a plurality of anchor windlass assemblies and a plurality of fairlead assemblies, a plurality of lengths of chain each having a multiplicity of interconnected links configured to move from a chain locker in cooperative relation through an associated anchor windlass assembly and an associated fairlead assembly, an anchor for each length of chain, and a connector connecting each anchor to the end of the associated length of chain outboard of the associated fairlead assembly so as to engage with the water bottom. The invention further comprises providing in each length of chain at least one link normally disposed within the chain locker inboard of the associated anchor windlass and fairlead assemblies, each of which includes a plurality of removably interconnected parts operable when interconnected to interengage with the adjacent links of the associated length of chain. Each one link has removable fasteners normally retaining its parts in interconnected relation in interengagement with the adjacent links and is adapted to receive within its confines an acoustical receiver and bolt assembly. Each assembly retains the link parts together and is operable in response to a predetermined transmitted acoustical signal after the associated one link has been moved to an operative position outboard of the associated fairlead assembly, to detonate thereby separating the link parts.

27 Claims, 12 Drawing Figures

Fig. 2
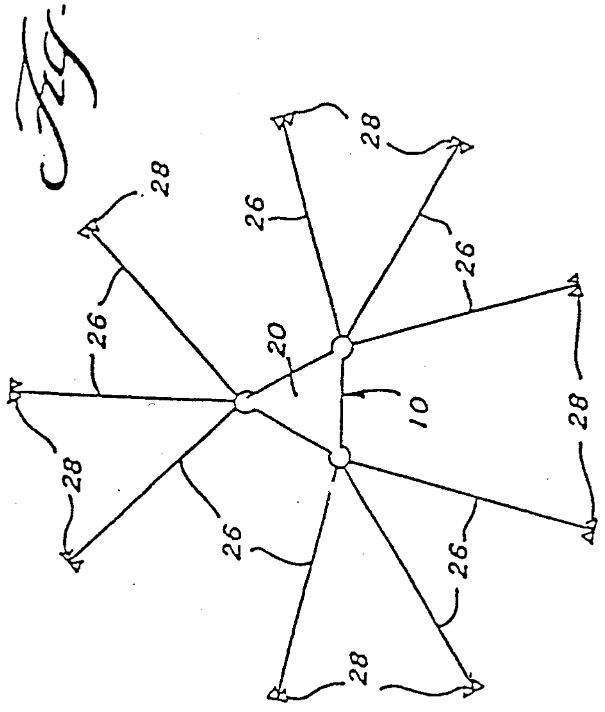
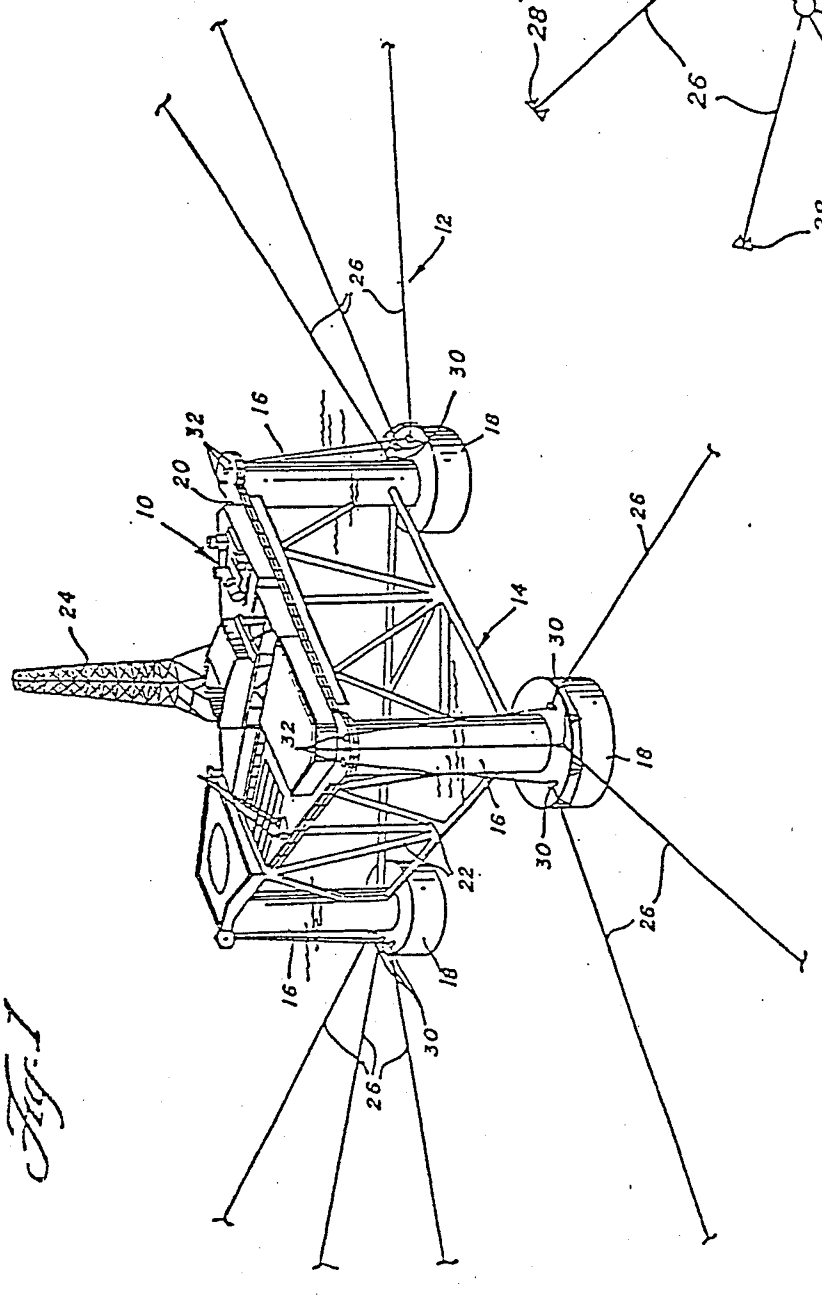
Fig. 1

ACOUSTICAL MOORING RELEASE SYSTEM

FIELD OF THE INVENTION

This application relates to mooring systems and more particularly to semi-submersible drilling rigs or the like having a mooring system capable of improved emergency disengagement.

BACKGROUND OF THE INVENTION

Mooring systems of the type to which the present invention is related consist essentially of a plurality of lengths of chain having anchors on the outboard ends thereof. The drilling rig or other instrumentality which the anchors and chains moor include chain handling mechanisms which enable the anchors to be deployed to render the system operational. Typically, each chain handling mechanism is used in conjunction with a chain locker within which the inboard end portion of the length of chain is stored. From the chain locker each chain extends in cooperative relation with an anchor windlass assembly. From the anchor windlass assembly, the chain extends in cooperating relation with a fairlead assembly. A typical semi-submersible drilling rig may involve the provision of three vertically extending tubular chain lockers which also provide flotation for the rig. Each chain locker has three anchor windlass assemblies associated therewith which normally are disposed at the platform level of the rig. Three cooperating fairlead assemblies are mounted in a submersible position below the anchor windlass assemblies. The mooring system thus provides nine lengths of chain and nine anchors which are spaced peripherally outwardly from the moored position of the rig.

It is sometimes necessary where emergency conditions arise, as for example when severe storms and hurricanes are impending, to release the rig from its mooring system. When these emergency conditions arise, it is simply not practical to attempt to haul in each of the nine anchors and lengths of chain. Various somewhat complex arrangements have been proposed for quickly severing the lengths of chain extending from the fairlead assemblies to the anchors. Examples of prior art devices of this type are disclosed in U.S. Pat. Nos. 3,905,190, 4,033,277 and 4,067,282. In all of these arrangements the approach is to include a specially constructed releasable connecting device in the length of chain that is disposed outboard of the associated fairlead assembly. The releasable connecting device normally functions effectively as a connector between two links of the chain, but is operable in response to a predetermined signal to separate the two links in the chain which it serves to connect. Because the releasable connecting device must remain in the water, it is constantly subjected to the harsh environment of sea water and as a result often fails to operate. Furthermore, the device in U.S. Pat. No. 4,067,282 for receiving the predetermined signal is deployed externally from the link, and as a result stoppers are required to ensure that the associated link is not passed through the fairlead and windlass assemblies, so that the external device is not damaged or more importantly to prevent the explosive device from being detonated while passing through the aforementioned assemblies. Accordingly, the handling and deployment of the U.S. Pat. No. 4,067,282 link is difficult, complex and involved in that it is designed not to pass through the chain handling assemblies.

In commonly assigned copending application Ser. No. 582,469 filed Feb. 22, 1984 there is disclosed a system which obviates the disadvantages noted above without providing offsetting disadvantages. As disclosed, the system includes at least one separable link in the length of chain which is of different construction than the remaining links, but yet is of a construction similar to the remaining links such that it will move in cooperating relation through the chain handling mechanism including the anchor windlass assembly and the fairlead assembly. Each such one link includes a plurality of removably interconnected parts operable when interconnected to interengage with adjacent links of the associated length of chain. The parts of each one link are interconnected either by manually removable fasteners or by one or more frangible fasteners. The interconnected parts of each link are normally stored in the chain locker interengaged with adjacent links. When it becomes necessary to effect an emergency release of the mooring system, an explosive bolt assembly is operatively mounted within the confines of each one link such that the link can then be deployed outboard of the associated windlass and fairlead assemblies for subsequent deformation causing the link parts to separate. Where manually removable fasteners are utilized, they are manually removed after (or before) each link has the explosive bolt assembly operatively set in to the link and before deployment and ignition. Where frangible fasteners are utilized, they are left in position so long as their fracture rating is such as to ensure that they will fracture when ignition of the explosive occurs.

Preferably, each one link includes a pair of similar, opposed U-shaped link parts having annular grooves formed therein near the free ends of the legs thereof and a pair of similar cooperating connector half parts each having opposed semicircular ridges movable laterally into a cooperating half of the associated annular grooves to retain the link parts together so long as the connector parts are retained together as by a pair of removable or frangible fasteners or alternatively by the bolt assembly capable of being explosively separated in response to a predetermined detonating signal. The application illustrates and describes a system wherein the detonation signal is hardwired to the explosive bolt assembly. With this arrangement, there is presented the disadvantages of wire handling and possible malfunctioning as a result thereof. While the aforesaid application indicates that acoustical detonation is contemplated, there is no disclosure as to how it would be accomplished.

One of the problems encountered in accomplishing this is to embody all of the acoustical receiver circuitry in the link. Existing receiver components available heretofore are not capable of being mounted within the confines of a link, and as a result would require a larger more expensive link that would also increase handling problems. Accordingly, it is an object of the present invention to provide low power consumption acoustical receiver circuitry capable of being provided within the confines of a link.

The present invention achieves this objective by providing an acoustical receiver and bolt assembly comprised of miniaturized acoustical receiving circuit, consuming very small amounts of power, for receiving a detonation signal, and a secnd class explosive which detonates when the receiving circuit receives the detonation signal. The use of a second class explosive is important because it provides an additional measure of safely in that it will be be detonated due to mishandling, i.e. dropping of the explosive assembly.

Additionally, the receiver portion of the assembly is designed to operate in conjunction with an acoustical transmitter which offers several more innovative safety features. First, the transmitter and receiver are designed for transmission and reception, respectively, of a signal composed of two frequencies. Thus the likelihood of misoperation, due to the receiver receiving a spurious signal, is substantially reduced. Secondly, the transmitter is designed for operation in a test mode, whereby the integrity and operability of each assembly can be verified prior to deployment. Thirdly, the transmitter also includes an arming mode, prior to the firing mode, in which a "handshake" is conducted between the transmitter and each one link, containing the assembly, which is to be detonated, to thereby verify that only specific desired links will be detonated. And finally, in actually transmitting the firing signal two operator actions must be performed within a predetermined period of time, thereby reducing the possibility of accidental detonation of any links.

Therefore, the present invention provides a separable link which is safely handled and deployed, in that after the assembly, containing the miniaturized, low power consumption receiving circuit and the secondary explosive, has been tested, it is mounted within the separable link which is then passed through the anchor windlass and fairlead assemblies, in order that it be deployed out at sea.

Another object of the present invention is the provision of an improved method of disengaging, under emergency conditions, a mooring system for a semi-submersible drilling rig or the like of the type described using the acoustical receiver and bolt assembly, containing the miniaturized receiver circuitry and secondary explosive as described above, which method comprises the steps of normally maintaining a separable link without the assembly in fastened relation between two links of each chain, in a position disposed in an associated chain locker when the associated anchor is deployed in its mooring position and then when the emergency conditions arise carrying out the following four steps: (1) mounting the assembly within each separable link (2) testing the assembly (3) operating the associated anchor windlass assembly to move the associated chain outwardly to deploy the separable link with the assembly mounted therein, and (4) detonating the assembly to separate the parts of the separable link, by transmitting the acoustical firing signal.

It will be appreciated by those skilled in the art that the present invention is not limited to the above-described application, but is capable of use anywhere where an acoustically linked transmitter and receiver are needed and a space problem exists with regard to the mounting or positioning of the acoustical receiver.

These and other objects of the present invention will become more apparent during the course of the following detailed description and appended claims:

BRIEF DESCRIPTION OF THE DRAWINGS

FIG. 1 is a perspective view of a semi-submersible drilling rig showing the same in operative relation within a body of water and the deployment of the chains of the mooring system thereof;

FIG. 2 is a somewhat schematic top plan view illustrating the drilling rig and the mooring system;

FIG. 2 shows the gain sweep component of the receiver circuitry in detail.

DETAILED DESCRIPTION OF THE INVENTION

Figure 3:
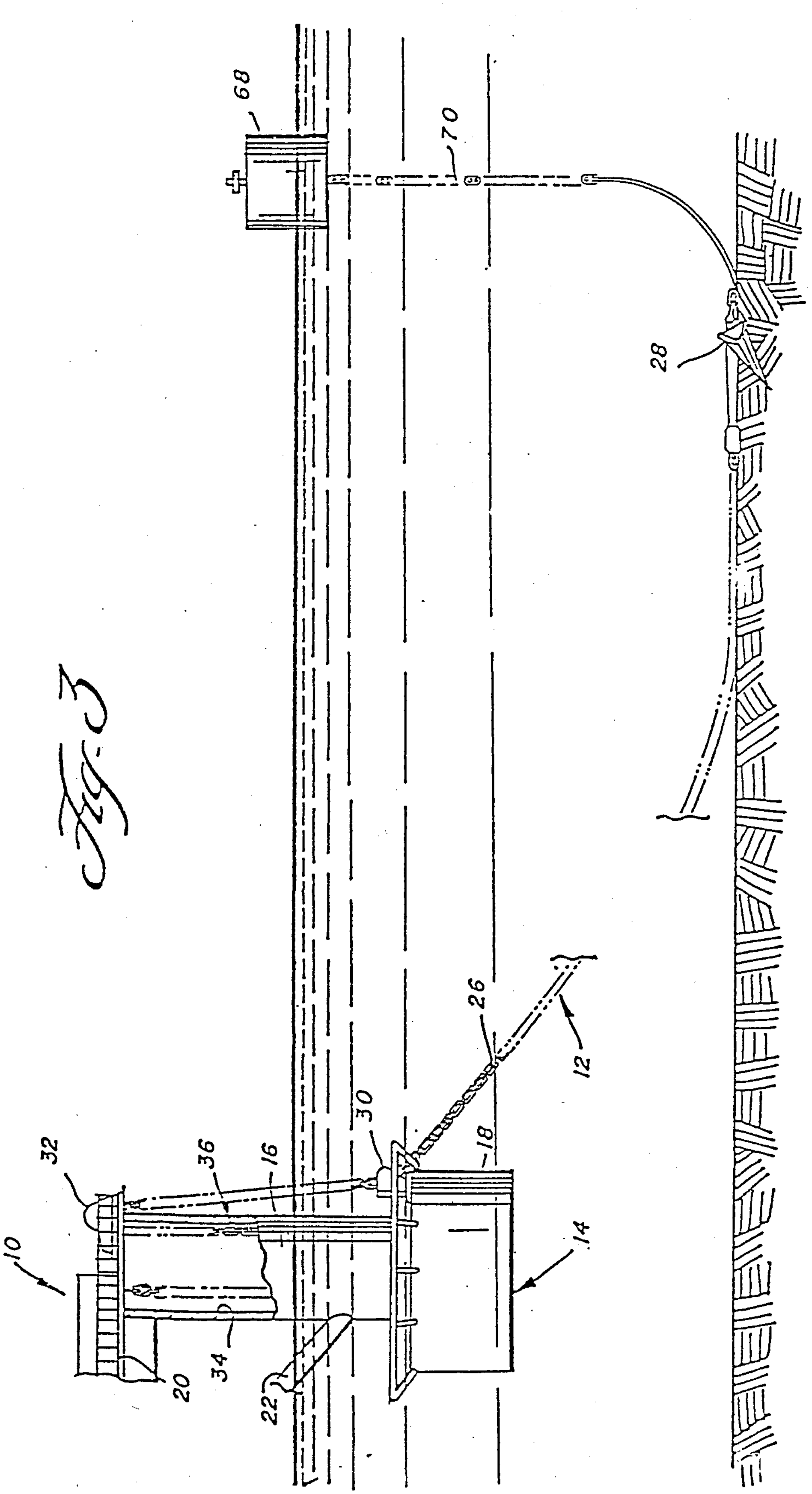
FIG. 3 is a fragmentary side elevational view with parts broken away for purposes of clearer illustration of a portion of the drilling rig and one of the mooring anchor and chain assemblies embodying the improvements of the present invention operatively connected therewith in its normal mooring position.

Referring more particularly to the drawings, there is shown in FIGS. 1-3 a conventional semi-submersible drilling rig, generally indicated at 10, having a mooring system, generally indicated at 12, which embodies the improvements of the present invention. The drilling rig, as shown, is of conventional triangular configuration, including a rigid frame structure, generally indicated at 14, which provides three vertical extending tubular frame members 16 each having a submerged cylindrical flotation chamber 18 on the lower end thereof. The upper ends of each of the three tubular members are fixed to three corners of an elevated drilling platform 20 forming a part of the frame structure 14. It will be understood that the frame structure 14 also includes suitable lower bracing elements 22 extending between the various tubular elements 16 and the platform 20. It will also be understood that the platform 20 is arranged to carry a derrick 24 and other components which render the rig 10 suitable for oil well drilling in accordance with conventional practice.

The mooring system 12 consists essentially of nine lengths of chain 26 having nine anchors 28 connected to the outboard ends thereof for deployment in outwardly disposed annularly spaced arrangement with respect to the rig as shown in FIG. 2. The inboard end portions of each length of chain 26 extends in cooperating relation with chain handling means provided on the rig and more specifically a fairlead assembly 30 positioned on an associated flotation chamber 18 and an anchor windlass assembly 32 on the platform structure 20 thereabove. From the anchor windlass assembly 32 each chain 26 extends into the interior of the associated tubular member 16 which constitutes a chain locker 34.

It will be understood that each length of chain 26 may be of any suitable construction. For example, a typical length of chain has an overall length of approximately 4,000 feet and is made up of 500-foot sections of three-inch oil rig quality welded stud links. Each adjacent pair of 500-foot sectional are interconnected by a connecting link of conventional construction, as for example, a three-inch oil rig quality connecting link of the type manufactured and sold by Baldt, Inc. Similarly, each anchor 28 may be of any conventional construction, a typical example being a 33,000 pound high holding power moorfast anchor with 34° and 50° fluke angle adjusting blocks of the type manufactured by Baldt, Inc.

Each length of chain 26 is such that in normal operation when the associated anchor 28 is engaged within the water bottom as shown in FIG. 3, all of the links of length of chain 26 extending outboard of the windlass anchor assembly 32 and associated fairlead assembly 30 will be of conventional configuration, such as mentioned above, sufficient to move in cooperating relation through both the fairlead assembly 30 and the associated anchor windlass assembly 32.

Figure 4:
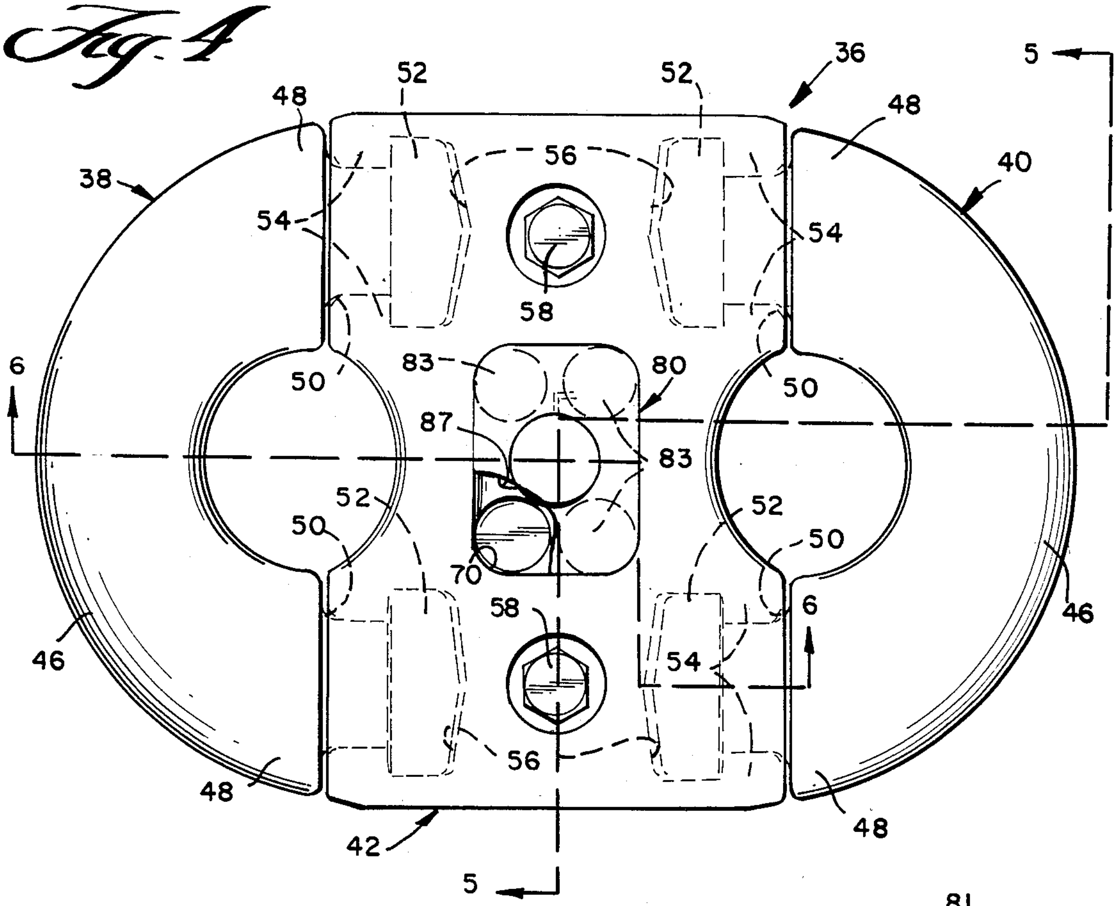
FIG. 4 is a top plan view of the explosively separable link having the acoustical receiver and bolt assembly in place and showing a tube hole in a cutaway portion of the Figure.

In accordance with the principles of the present invention, within the portion of each length of chain 26 which is normally disposed inboard of the associated anchor windlass assembly 32 and within the associated chain locker 34, there is provided a separable link which is adapted to internally receive an acoustical receiver and bolt assembly, which comprises a miniaturized acoustical receiver and a secondary explosive. The separable link is generally indicated at 36 and embodies the principles of the present invention. As best shown in FIG. 4, the separable link 36 is configured similarly to the links of the length of chain 26 in that it is configured to move in cooperating relation through the anchor windlass assembly 32 and fairlead assembly 30 in the same manner as the links of the length of chain 26. Each separable link 36 is normally disposed, as aforesaid, within the associated chain locker 34 inboard of the associated anchor windlass assembly 32.

Figure 5:
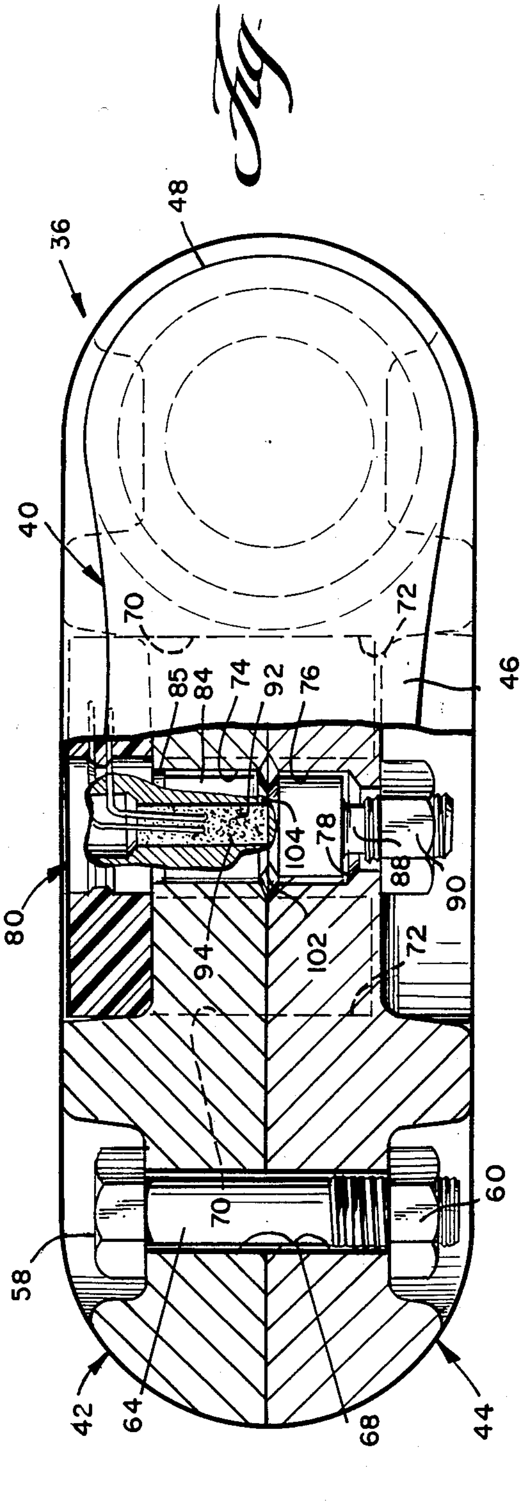
FIG. 5 is an enlarged fragmentary sectional view taken along the line of 5—5 of FIG. 4.
Figure 6:
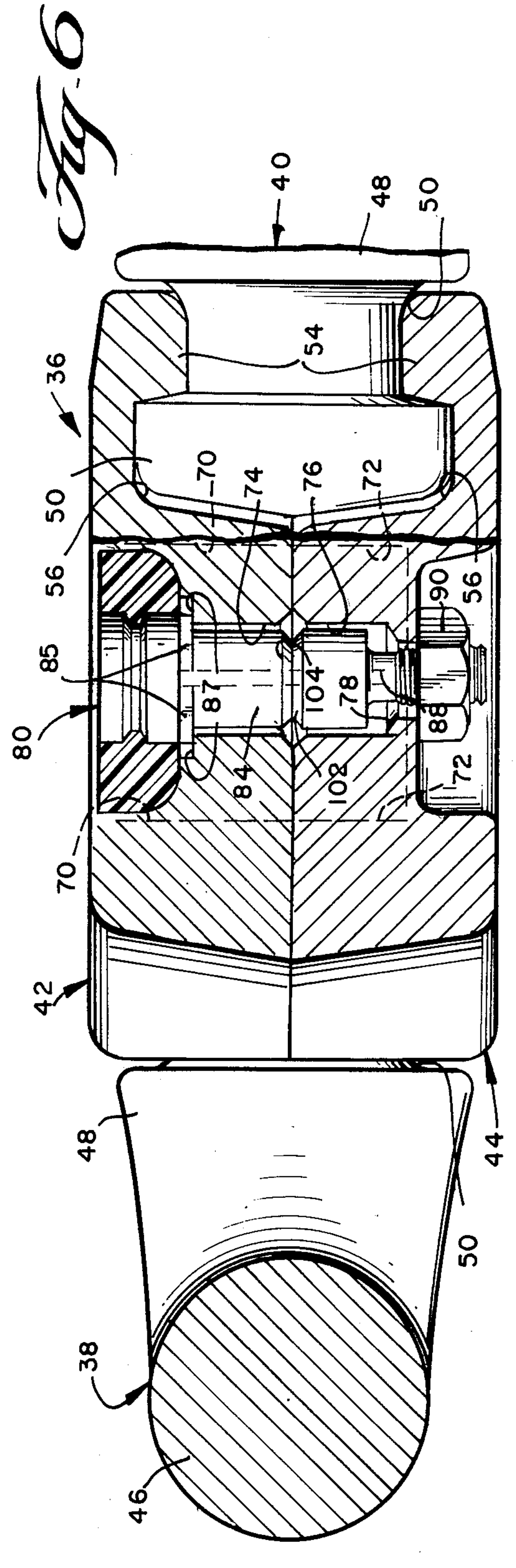
FIG. 6 is an enlarged sectional view taken along the line 6—6 of FIG. 4.

Referring now more particularly to FIGS. 4–7 each separable link 36 is formed of a plurality of parts which are removably interengaged so as to interconnect with adjacent links in the associated length of chain 26. As shown, the parts include two generally similar opposed U-shaped link parts, generally indicated at 38 and 40, and a pair of similar cooperating connector half parts, generally indicated at 42 and 44. As best shown in FIG. 4, each link part 38 and 40 includes a bight portion 46 having a pair of leg portions 48 extending therefrom. As shown in FIGS. 5 and 6, the bight portion and leg portions are of generally circular-sectional configuration. Formed in each leg portion 48 in spaced relation from the free end thereof is an annular groove 50. The associated free end is of reduced diameter size and shaped to provide a knob 52.

Each connector half part 42 and 44 is of generally I-shaped configuration in plan. Formed on inner end surfaces of each connector half part are four semicircular ridges 54 each of which is of a shape to enter laterally into an associated annular groove 50. A recess 56 is formed adjacent each ridge 54 to receive the associated knob 52. As can be seen from FIG. 6, when the two connector half parts 42 and 44 are moved laterally together so that their opposed inner surfaces abut one another, the knobs 52 of the leg portions 48 of the two link parts 38 and 40 are captured and retained against movement apart so long as the connector parts 42 and 44 are retained against lateral movement in direction away from one another.

Removable fastening means, preferably in the form of two fasteners, generally indicated at 58, are provided to normally retain the parts in their interengaged relation in interengagement with adjacent links in the associated chain 26 as aforesaid. As best shown in FIG. 5, each fastener 58 includes a cylindrical shank portion 64 exteriorly threaded at one end for receiving a nut 60. As shown, each connector parts 42 and 44 are formed with a pair of throughbores 68 of a size to permit passage of the shank portions 64 therethrough.

Each connector part 42 also has a central opening 74 formed therein in parallel relation between the bores 68 and four openings 70 spaced about the central opening 74. Each connector part 44 includes an interiorly counterbored opening 76, corresponding to the central opening 74, providing an inwardly facing annular shoulder 78. Each connector part 44 also includes four openings 72 which do not extend all the way therethrough and which correspond to the four openings 70 in connector part 42. Openings 70, 72, 74 and 76 are adapted to receive therein the acoustical receiver and bolt assembly, generally indicated at 80. The assembly is shown in perspective in FIG. 7 to be comprised of a rectangular casing 81, a headed cylindrical shank 84 and tubes 83, which can be filled and sealed with epoxy or equivalent material.

Figure 7:
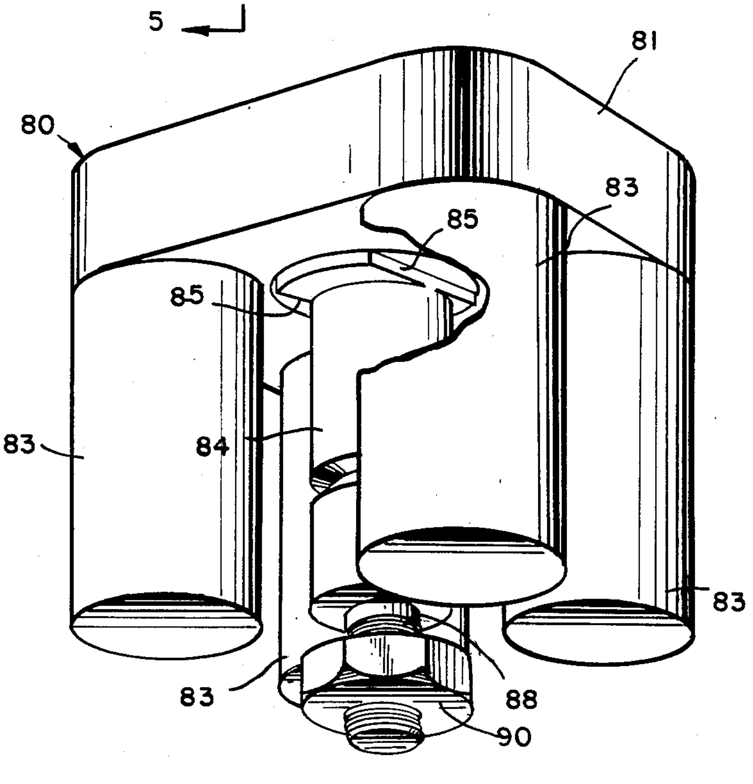
FIG. 7 is a perspective view of the container of the acoustical receiver and bolt assembly.

As best shown in FIGS. 6 and 7, the preferred embodiment of the assembly 80 includes the rectangular casing 81 from which the central cylindrical shank 84 and four tubes 83 extend. The cylindrical shank 84 contains the secondary explosive and the four tubes which are located at the corners of the casing 81 contain the miniaturized acoustical receiver circuitry, which will be described in greater detail below. The head of the shank is flattened at its lower portion, as indicated at 85, so as to fit within a rectangular recess 87 in the associated part 42 to thereby enable a torque to be applied to the shank without being transmitted to the tubes. The end portion of the shank 84 is formed with a reduced diameter which forms an annular shoulder 86. The extremity of the reduced end portion of the shank 84 is exteriorly threaded, as indicated at 88, to threadedly receive a nut 90.

Extending inwardly into the central portion of the shank 84 is a bore 92 defining a cavity within which the secondary explosive 94 is mounted. The exterior periphery of the shank 84 is formed with an annular recess 102 (see FIG. 6), the inner portion of which defines with the inner end of the explosive cavity 92 an annular weakened section 104 designed to fracture upon detonation of the explosive 94.

As previously explained, in the normal operation of the drilling rig 10, the separable link 36 associated with each length of chain 26 is interconnected with the links of the length of chain at a position such that when the length of chain 26 is operationally deployed with the associated anchor 28 in engagement with the water bottom to effectively moor the drilling rig, the associated separable link 36 will be positioned inboard of the associated anchor windlass assembly 32 and within the associated chain locker 34. An exemplary position is illustrated in FIG. 3. When it is desired to effect emergency disengagement of the mooring system 12, each separable link 36 is fitted with an acoustical receiver and bolt assembly 80 and then fasteners 58 are removed. After testing the assemblies, each anchor windlass assembly 32 is operated to pay out the associated chain 26 until the separable link 36 containing the assembly moves in cooperating relation through the anchor windlass assembly. Preferably, the deployment of the separable link 36 is not only outboard of the associated anchor windlass assemblies 32 but outboard of the associated fairlead assemblies 30 as well. Once the separable links 36 are deployed in their outboard positions, an acoustical signal in transmitted from a transmitter (described in detail below) to the acoustical receiver and bolt assembly mounted within the separable links 36, in order to detonate the explosives 94 which, in turn, causes the shanks 84 to fracture at their weakened sections 104. Shoulder 86 of shank 84 is thus moved into engagement with shoulder 78, which separates the parts 42 and 44 allowing the adjacent links of the chain 26 connected with the links parts 38 and 40 to separate. In this way each chain 26 is separated from the rig 10 allowing it to be appropriately handled under emergency conditions.

In accordance with the principles of the invention since under emergency conditions a number of extensive lengths of chain 26 and attached anchors 28 will be left in the water bottom, it is preferable to provide a locating buoy 106 (see FIG. 3) for locating each anchor and chain assembly. As shown, each locating buoy 106 is connected with the associated anchor 28, as by a line or length of chain 108 connected at one end to the buoy and at its other end to the associated anchor 28. With this arrangement it will be understood that after the mooring system 12 has been released and the rig 10 moved to a safe location, the mooring system 12 can be retrieved simply by locating the buoys 106 and then retrieving the anchors 28 and attached lengths of chain 26 by hauling in the lines 108.

It is preferable to utilize removable fasteners 58 and to remove them allowing the assembly 80 to remain as the sole securement of the link parts when deployed under emergency conditions. It will be noted, however, that the arrangement is such that the assembly 80 prior to detonation, while weakened to permit severance, nevertheless serves to retain the link parts together under load, since the load is not transmitted directly to the assembly 80. Consequently it is within the contemplation of the present invention that the fasteners 58 be frangible in response to the detonation of the assembly 80 so as not to require their removal prior to deployment.

Figure 8:
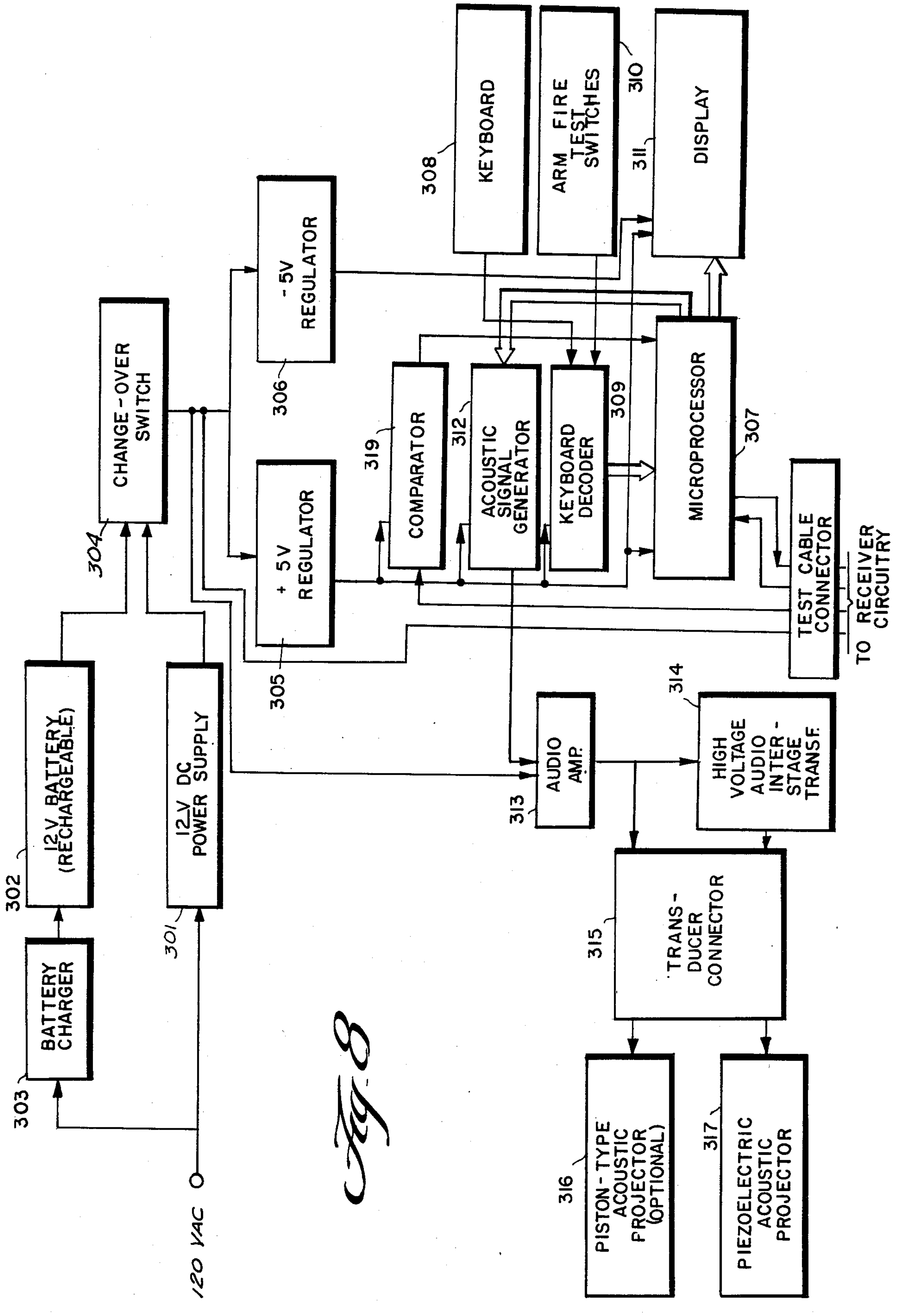
FIG. 8 is a block diagram of the transmitter used for transmitting the detonation signal.

FIG. 8 shows the transmitter of the present invention to be powered from a conventional 120 volt AC power supply which is provided to both a 12 volt DC power supply 301 and a battery charger 303. The output of the battery charger 303 is provided to a 12 volt rechargeable battery 302, and the outputs from the rechargeable battery 302 and the power supply 301 are provided to a selectable changeover switch 304. The changeover switch allows an operator to select the 12 volt output from the battery or the 12 volt DC power supply for powering the transmitter. The output from the changeover switch 304 is provided to voltage regulators 305 and 306 which output +5 volts and −5 volts, respectively, to test cable connector 318 and to audio amplifier 313. The voltage regulator 305 supplies power to a microprocessor 307, for example National Semiconductor model No. NSC800, a keyboard decoder 309, for example Harris Corporation model No. 6516, a dualtone signal generator 312, for example National Semiconductor model No. TP53130, a comparator 319 and a display 311, for example IEE model no. 3802-09-032. The voltage regulator 306 also supplies power to the aforementioned display 311.

The microprocessor 307 accepts inputs from the keyboard decoder 309, the comparator 319, and from a test cable connector 318, and provides outputs to the acoustic signal generator 312, the display 311 and the test cable connector 318. The keyboard decoder 309 accepts inputs from a keyboard 308, for example a Microswitch sealed keyboard model No. PX2-P12K10A1A-002, and from a plurality of single pushbutton switches 310. The acoustic signal generator 312 provides its output to the audio amplifier 313, for example Sony Corporation model No. XM55, and the audio amplifier can drive a piston type acoustic projector 316, through a transducer connector 315, or a piezoelectric acoustic projector 317, through a high voltage audio interstage transformer 314 and the transducer connector 315. In addition to the input to and the output from the microprocessor 307, the test cable connector 318 is connected to the changeover switch 4, as mentioned above, and to the comparator 19, and to the audio amp 313.

Figure 9:
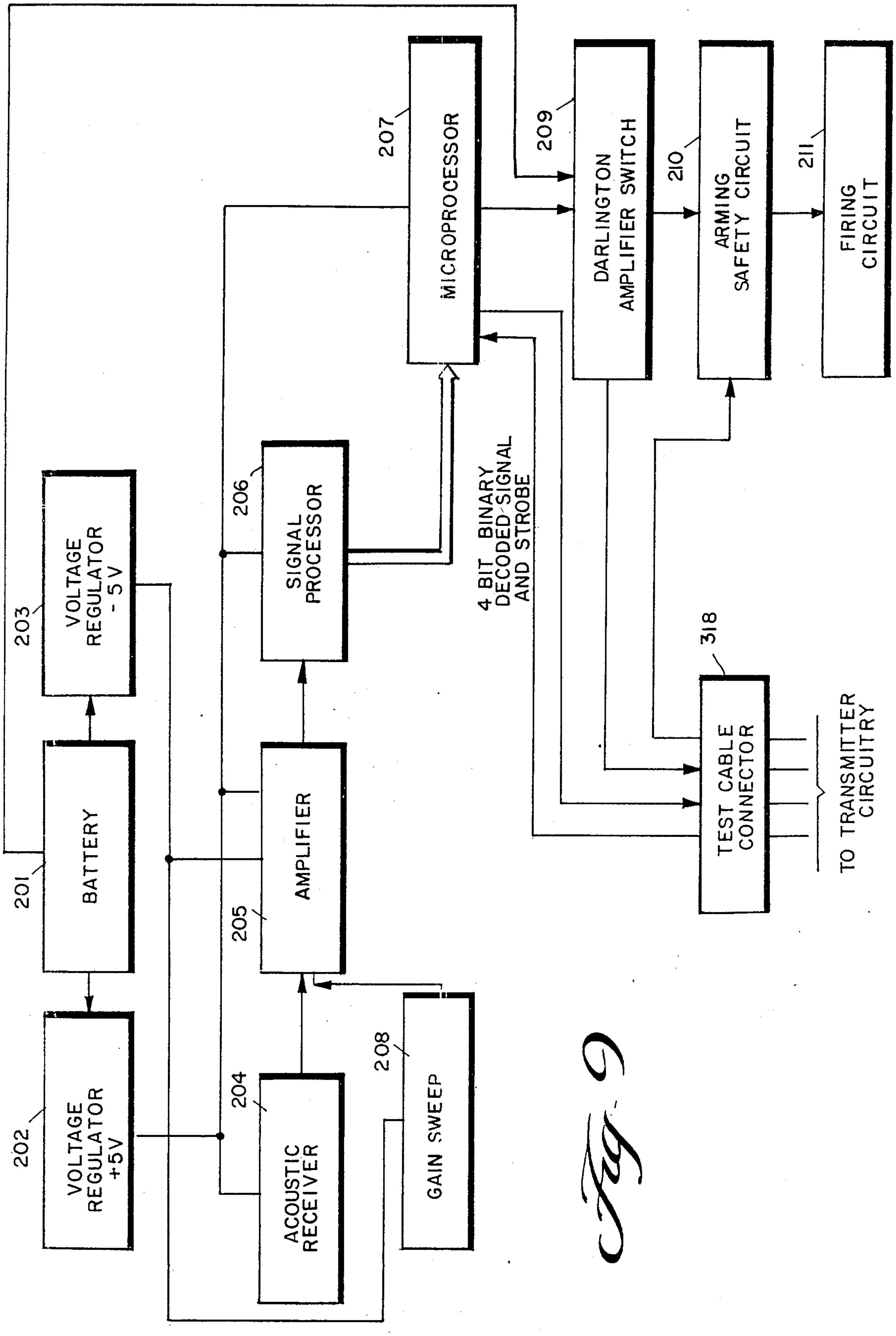
FIG. 9 is a block diagram of the miniaturized receiver circuitry used for receiving the detonation signal from the transmitter of FIG. 8.

FIG. 9 shows the miniaturized receiver circuitry, which fits inside the separable link, to be comprised of a battery 201 which supplies power to voltage regulators 202 and 203, which output +5 volts and −5 volts, respectively, and to a Darlington amplifier switch 209. The voltage regulator 202 supplies a gain sweep 208 (which will be described in greater detail below), an acoustic receiver 204, for example Benthos Inc. model No. AQ165 or equivalent, an amplifier 205, for example NSC 4250 or equivalent, a signal processor 206 (which will be described in greater detail below) and a microprocessor 207, for example NEC model No. μPD80C48 (or μPD80C35 if an associated EPROM not shown is used). The voltage regulator 203 supplies power to the gain sweep 208 and the amplifier 205. The acoustic receiver 204 receives the detonation signal from the transmitter and provides an output to the amplifier 205 which amplifies the signal in accordance with the control of the gain sweep 208. The amplified signal is provided to the signal processor, which scans the signal for the two frequencies and processes the signal into a binary coded output, which is in turn provided to the microprocessor 207. The microprocessor 207 drives the Darlington amplifier switch 209, which provides its output to an arming safety circuit 210.

The arming safety circuit 210 consists of a relay and associated contacts, for example a Teledyne relay with a 12 volt coil having normally closed contacts. If the arming safety circuit relay coil is deenergized then the output of the Darlington amplifier switch 209 is provided to a firing circuit 211, for example Reynolds Industries, Inc. model No. FS51, through the normally closed contacts and if the relay of the arming safety circuit 210 is energized then the output from the Darlington amplifier switch 209 is not provided to the firing circuit because of the opened contacts.

The test cable connector 118 receives inputs from the microprocessor 207 and from the Darlington amplifier switch 209 and provides connections to the microprocessor 207 and to the arming safety circuit 210.

Figure 12:
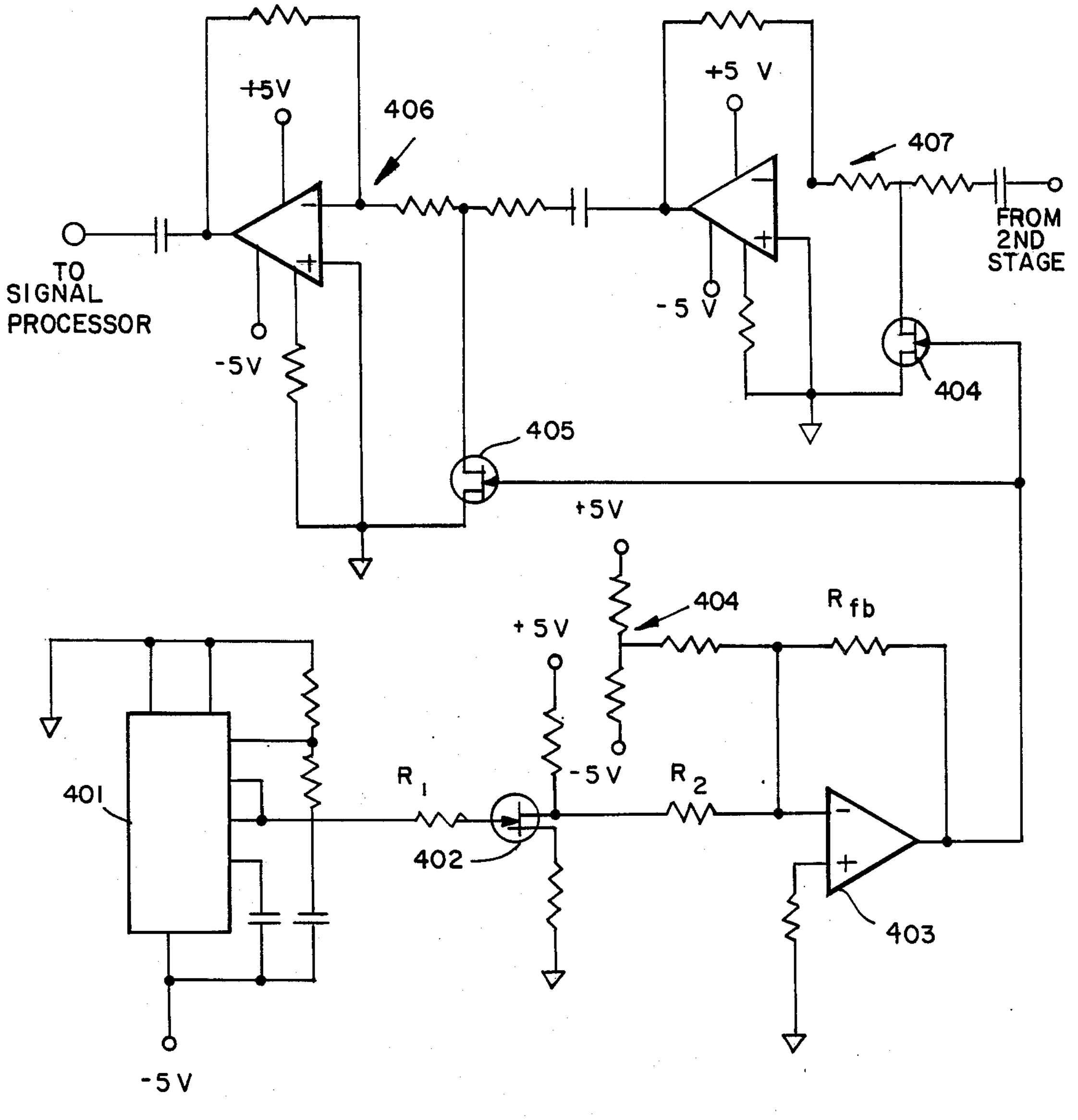

As can be seen in FIG. 12, the gain sweep 208 is comprised of voltage ramp signal generating means 401, for example a 555 CMOS timer, a buffer input circuit means 402, for example a FET, an operational amplifier 403, and output devices 404 and 405, for example FETs. The voltage ramp signal from generating means 401 is applied through the resistor $R_1$ to the buffer input circuit means 402. The buffer means 402 applies its output to the negative terminal of operational amplifier 403. A biasing circuit is also applied to the negative terminal of the operational amplifier 403. The operational amplifier sums the inputs at its negative terminal and accordingly shifts the level of the voltage ramp signal up or down depending upon the biasing circuit 404 output. The output of the operational amplifier is used to drive output devices 404 and 405, which are, respectively, connected to a third stage 407 and a fourth stage 406 of amplifier 205. Because the resistance of the output devices varies in accordance with the output signal of the operational amplifier the gain of the third and fourth stages is controlled in accordance with the output signal from the operational amplifier. The above described gain sweep 208 offers advantages over conventional AGC circuits, in that low phase shift results in the two frequency acoustic signal, input to the amplifier 205, as a result of the gain control from the gain sweep 208.

The signal processor, comprises for example a Teltone model No. M956, in which digital frequency analysis (i.e., digital filtering), amplitude comparing, frequency determination and timing discrimination are carried out. Thus, the signal processor checks the inputted signal for the above parameters and, if they are present, outputs the proper binary decoded signal to the microprocessor 207.

The operation of the present invention will now be described with reference to FIGS. 8 and 9. When preparing a specific separable link for detonation the link is first provided with the acoustical receiver and bolt assembly 80. This assembly as mentioned above, comprises the secondary explosive and the miniaturized acoustic receiver circuitry, shown in FIG. 9. After the assembly is installed within the link, the circuitry can be tested by connecting the test cable connector between the transmitter and receiver circuitry. The test mode is then activated by operating the test pushbutton of the plurality of pushbutton switches 310. The keyboard decoder interfaces the keyboard 308 and switches 310 with the microprocessor 307. At this time, the transmitter microprocessor 307 interrogates the microprocessor 207 of the assembly 80 contained in the separable link, through the test cable connection, to obtain the ID of the assembly 80. The link microprocessor 207 responds by providing its ID to the microprocessor 307, which displays the ID on display 311. If the link communication is good then the displayed address is stored in the microprocessor 307 by pressing an enter key on the keyboard 308. The test button is then operated again and the microprocessor sends out the ID and activates the acoustic signal generator 312 which outputs the two frequency acoustical signal. The signal from the acoustic signal generator 312 is provided to the audio amplifier 313 which in turn provides it to either a piston type acoustic projector 316 or a piezoelectric projector 317, as has been described above. As will be appreciated by those skilled in the art, the acoustic projector is deployed in the water, however, for the purposes of the testing the projector is closely coupled to the acoustic receiver 204 of the acoustical receiver and bolt assembly 80. Thus, the signal from the acoustic projector will be directly coupled to the acoustic receiver 204 of the assembly 80, and the assembly 80 circuitry should operate in the above described manner. Because the test cable connector 318 connects the transmitter and receiver circuitry the arming safety circuit 210 is energized to thereby block the ignition signal from reaching the firing circuit 211. In addition, the ignition signal level from the Darlington amplifier switch 209 is provided through the testcable connector to the comparator 319 where it is compared with a reference level voltage to determine whether it is suitable for igniting the explosive. The comparator results are provided to the microprocessor 307 which determines whether the signal is adequate for igniting the explosive and displays the results of this determination on the display 311. Therefore, after the second operation of the test button the communication between the transmitter circuitry and the proper receiver circuitry is ascertained and the level of the ignition signal is monitored to determine whether it is adequate to ignite the explosive.

To arm a separable link in which the assembly 80 has already been installed, the key 3 is depressed on the keyboard 308, a unit number is entered via the keyboard (from one to sixteen), the enter key on the keyboard is depressed and the address corresponding to the particular unit number is displayed on the display unit 311. At this time if it is still desired to arm the particular unit then the arm push button 310 should be depressed. The microprocessor will indicate through the display that the particular unit is being armed and when the display indicates that the arming is finished the operator must depress the enter key on the keyboard to acknowledge the arming of the particular unit.

To fire the armed separable links, the key 4 on the keyboard should be depressed. At this time if both fire buttons are depressed then all of the separable links which have been armed will be fired.

In addition to the above described functions the microprocessor is also capable of the following additional functions, storage of link addresses, viewing link addresses, and disarming all links. These functions operate in a similar manner to the functions described above, in that particular keys on the keyboard must be depressed in response to instructions displayed on the display unit 311.

Figure 10:
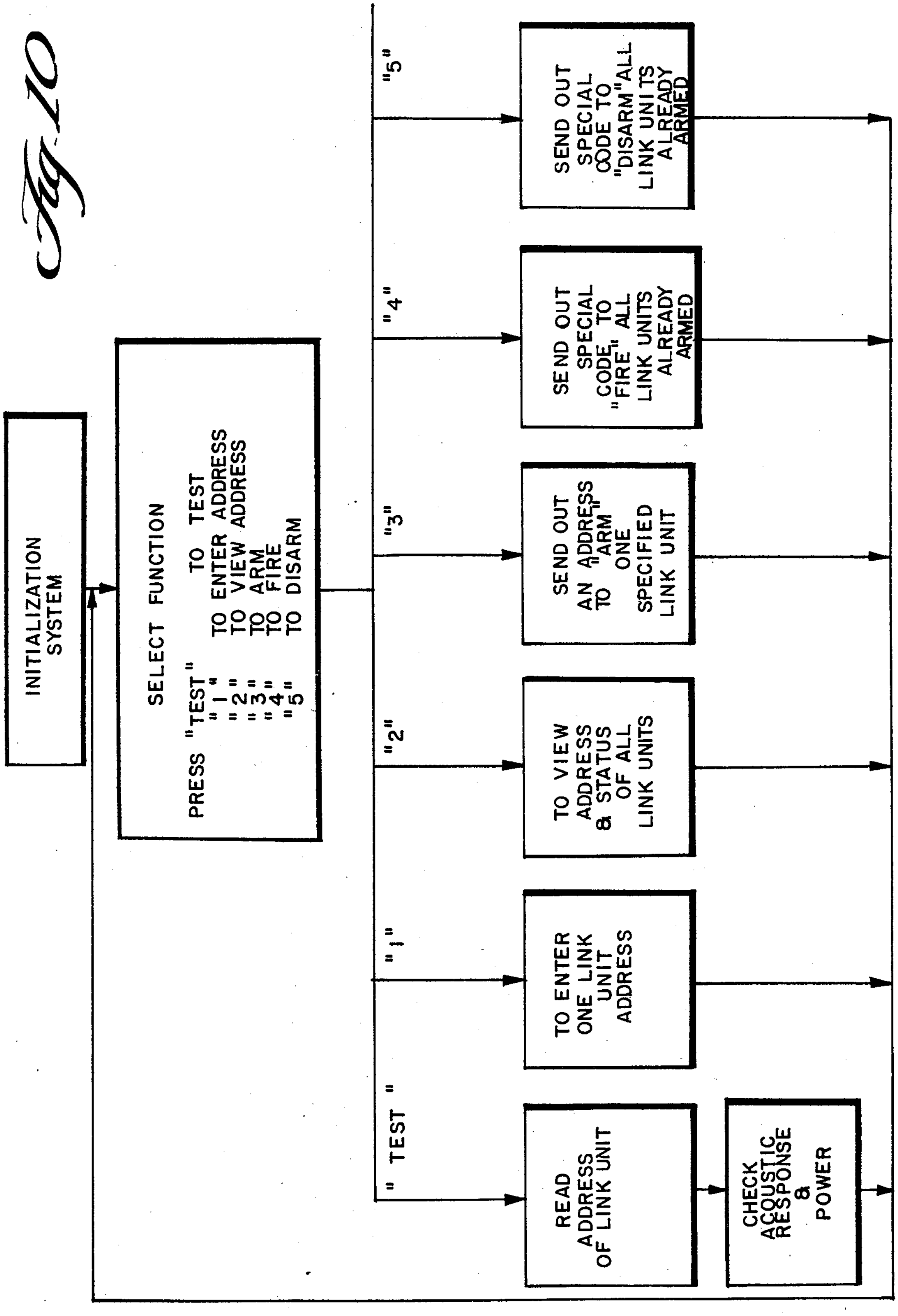
FIGS. 10 and 11 are flowcharts which describe the operation of the transmitter and receiver of FIGS. 8 and 9, respectively.

FIG. 10 shows the flowchart for the transmitter microprocessor and which keys and switches must be actuated to select between the various functions possible. As can be seen in the "Select Function" box the functions are listed with the appropriate button or key on the keyboard which must be depressed in order to activate the transmitter circuitry for the particular function. As can be seen under "Test" the flowchart indicates that the address of the link unit is read and that subsequently the acoustic response and power is checked. The operations necessary for the other functions are also set forth in the flowchart of FIG. 10.

Figure 11:
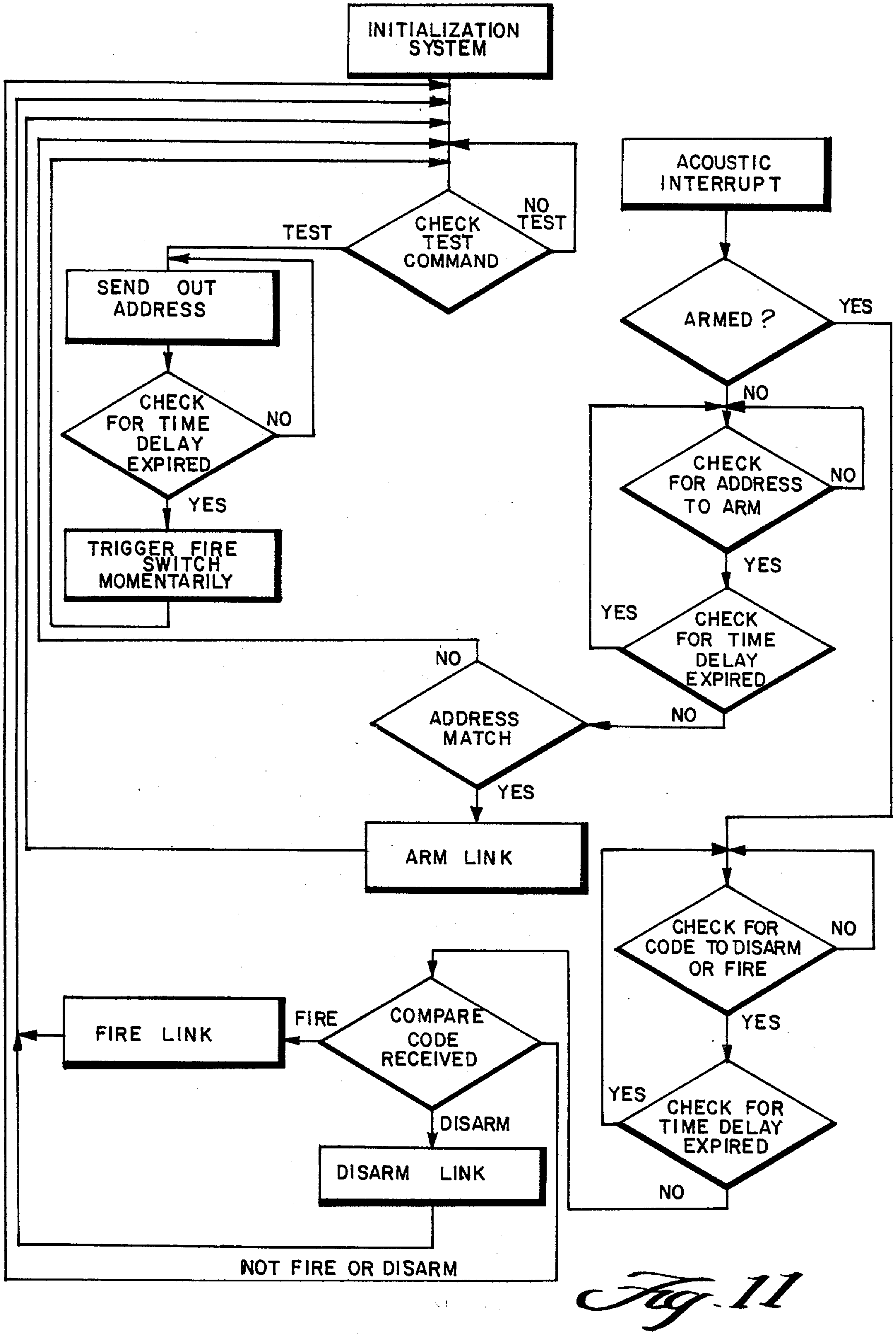

FIG. 11 shows the flowchart for the separable link. As can be seen from the flowchart, after initialization the separable link continuously checks to determine if a test of its circuitry has been called for. If a test has been called for then the address of the link is sent out and subsequently the firing switch is triggered momentarily. In addition, the flowchart indicates an acoustic interrupt input from the microprocessor 307 which is used to arm or fire the separable link. As can be seen from the flowchart when an acoustical interrupt is provided to the separable link, the circuitry first determines whether it has been armed or not. If it has not been armed, the link checks for its address to arm and if there is an address match before a time delay expires then the separable link is armed. Subsequently, when the microprocessor 307 transmits another acoustical interrupt, the separable link determines that it has already been armed and at that time checks for its particular code to either disarm or fire. If the proper firing code is determined to have been received before a time delay expires then the link is fired.

It will be understood that the system can be modified to provide the function of an acknowledge answer back from the receiver to the transmitter via acoustical signals. Circuitry for enabling such function to be achieved is known. The acknowledge answer back function would be particularly useful when the separable link is deployed in situations other than mooring release situations, as, for example, buoy releases, marine towage, construction anchorage, and the like.

It thus will be seen that the objects of this invention have been fully and effectively accomplished. It will be realized, however, that the foregoing preferred specific embodiment has been shown and described for purposes of illustrating the functional and structural principles of this invention and is subject to change without departure from such principles. Therefore, this invention includes all modifications encompassed within the spirit and scope of the following claims.

What is claimed is:

1. A separable link for use with a moorable vessel, such as a semi-submersible drilling rig, having a plurality of chain lockers, a plurality of anchor windlass assemblies and a plurality of fairlead assemblies, a plurality of lengths of chain each having a multiplicity of interconnected links configured to move from a chain locker in cooperative relation through an associated anchor windlass assembly and an associated fairlead assembly, an anchor for each length of chain, and means connecting each anchor to the end of the associated length of chain outboard of the associated fairlead assembly so as to engage with the water bottom, the separable link comprising:

a plurality of removably interconnected parts operable when interconnected to interengage with the adjacent links of the associated length of chain;

said separable link being shaped to be moved from a position inboard of the associated anchor windlass and fairlead assemblies to an operative position outboard thereof;

an acoustical receiver and explosive assembly operable to be disposed in operable relation with said parts within the confines of said separable link so as to enable the separable link with said assembly in said operable relation therewith to be moved from said inboard position into said operative position;

said assembly in said operative relation including (1) retaining means retaining said parts together, (2) acoustical signal receiver means and (3) explosive means, including an explosive, operable when said acoustical receiver means receives a predetermined acoustical signal after the separable link has been moved into said operative position to release the retention of said retaining means and separate the parts of said separable link.

2. A separable link as claimed in claim 1, said parts of said separable link including a pair of similar, opposed U-shaped link parts having annular grooves formed therein near the free ends of the legs thereof and a pair of similar cooperating connector half parts each having opposed semicircular ridges movable laterally into a cooperating annular groove.

3. A separable link as claimed in claim 2, wherein each connector half part is of generally I-shaped configuration in plan.

4. A separable link as claimed in claim 3, further comprising removable fastener means including a pair of nuts and a pair of laterally spaced headed fasteners extending through said similar cooperating connector half parts and being threaded at one end to receive said pair of nuts said removable fastener means normally retaining said parts in interconnected relation in interengagement with the adjacent links and being removed after said assembly is installed.

5. A separable link as claimed in claim 4, wherein said assembly includes a shank having an exteriorly threaded free end portion of reduced diameter defining an annular shoulder facing toward said free end, said shank having a cavity formed at the other end thereof for receiving said explosive, a casing means for receiving said acoustical receiver means, one of said pair of half parts having openings therein for receiving therethrough said shank and said casing means, the other of said pair of half parts having a counterbored opening for receiving the threaded free end position of said shank therethrough and openings for receiving said casing means therein, and a nut threaded on the free end portion of said shank, said counterbored opening defining an annular shoulder facing in a direction toward the annular shoulder on said shank.

6. A separable link as claimed in claim 5, said casing means comprising a rectangular case and four tubes extending from the corners of said rectangular case, and wherein said shank extends from the center of said rectangular case parallel to said four tubes.

7. A separable link as claimed in claim 1, said acoustical signal receiver means comprising:

an acoustic receiver for receiving a predetermined transmitted acoustical signal and outputting an output signal in accordance with said acoustical signal;

signal processor means for receiving said output signal from said acoustic receiver and converting it to a binary decoded signal;

control means for receiving said binary decoded signal from said signal processor means and outputting a control signal in response to said binary coded signal, said explosive means being operatively connected to said control means for receiving said control signal and detonating in response thereto.

8. A separable link as claimed in claim 7, said signal processer means comprising:

an amplifier for receiving and amplifying said output signal from said acoustic receiver;

a gain sweep for automatically controlling the gain of said amplifier; and a signal processor for receiving the amplified output of said amplifier and outputting said binary decoded signal to said control means.

9. A separable link as claimed in claim 8, said gain sweep comprising:

a means for generating a voltage ramp signal;

a buffer means for receiving said voltage ramp signal from said generating means and outputting a buffered signal;

an operational amplfiier having a biasing circuit connected to one terminal and also receiving said buffered signal at said one terminal, said operational amplifier summing the inputs at said one terminal and thereby acting as a ramp level shifter; and at least one output device receiving the output of said operational amplifier, the resistance of said output device varying in accordance with the output of said operational amplifier, said at least one output device being operatively connected to said amplifier for varying the gain of said amplifier in accordance with the variation in resistance of said output device.

10. A separable link as claimed in claim 9, wherein said output device is a field-effect-transistor.

11. A separable link as claimed in claim 7, said explosive means comprising;

a means for receiving said control signal and outputting an ignition signal in response thereto;

an arming safety circuit means for receiving said ignition signal from said receiving means and selectively outputting said ignition signal; and a firing circuit including an explosive, said explosive detonating when said firing circuit receives said ignition signal from said arming safety circuit means.

12. A separable link as claimed in claim 7, wherein said acoustical signal is comprised of two simultaneous frequencies.

13. A method of disengaging, under emergency conditions, a mooring system for semi-submersible drilling rig or the like which includes a plurality of chain lockers, a plurality of anchor windlass assemblies and a plurality of fairlead assemblies, a plurality of lengths of chain each having a multiplicity of interconnected links configured to move from a chain locker in cooperative relation through an associated anchor windlass assembly and an associated fairlead assembly, an anchor for each length of chain and means connecting each anchor to the end of the associated length of chain outboard of the associated fairlead assembly so as to engage with the water bottom, said method comprising:

normally maintaining a separable link, without an acoustical receiver and bolt assembly, in fastened relation between two links of each chain in a position disposed in an associated chain locker when the associated anchor is deployed in its mooring position, and then when the emergency conditions arise, carrying out the following steps:

installing an acoustical receiver and explosive assembly within each separable link;

operating each associated anchor windlass assembly to move the associated chain outwardly to deploy each separable link, with an acoustical receiver and explosive assembly installed, outwardly of the associated fairlead assembly; and detonating each acoustical receiver and explosive assembly to separate the separable link by transmitting a predetermined acoustical signal that when received by said assembly causes said assembly to detonate.

14. A method as claimed in claim 13 further comprising the step of testing the acoustical receiver and explosvie assembly before said installing step.

15. An acoustical detonation system having an acoustical transmitter portion and an acoustical receiver portion, said acoustical receiver portion comprising:

an acoustic receiver for receiving a predetermined transmitted acoustical signal and outputting an output signal in accordance with said acoustical signal;

signal processor means for receiving said output signal from said acoustic receiver and converting it to a binary decoded signal;

control means for receiving said binary decoded signal from said signal processor means and outputting a control signal in response to said binary coded signal;

explosive means being operable connected to said control means for receiving said control signal and detonating in response thereto, said signal processor means comprising:

an amplifier for receiving and amplifying said output signal from said acoustic receiver;

a gain sweep for automatically controlling the gain of said amplifier;

a signal processor for receiving the amplified output of said amplifier and outputting said binary decoded signal to said control means, said gain sweep comprising:

a means for generating a voltage ramp signal;

a buffer means for receiving said voltage ramp signal from said generating means and outputting a buffered signal;

an operational amplifier having a biasing circuit connected to and receiving said buffered signal at one terminal, said operational amplifier summing the inputs at said one terminal and thereby acting as a ramp level shifter; and at least one output device receiving the output of said operational amplifier, the resistance of said output device varying in accordance with the output of said operational amplifier, said at least one output device being operatlvely connected to said amplifier for varying the gain of said amplifier in accordance with the variation in resistance of said output device.

16. A system as clamed in claim 15, wherein said output device is a field-effect-transistor.

17. A system as claimed in claim 15, said explosive means comprising:

a means for receiving said control signal and outputting an ignition signal in response thereto;

an arming safety circuit means for receiving said ignition signal from said receiving means and selectively outputting said ignition signal; and a firing circuit including an explosive, said explosive detonating when said firing circuit receives said ignition signal from said arming safety circuit means.

18. A system as claimed in claim 15, wherein said acoustical signal is comprised of two simultaneous frequencies.

19. A system as claimed in claim 15, said transmitter portion comprising:

an acoustic projector for transmitting said predetermined acoustical signal to said acoustic receiver;

an acoustic signal generator for outputting said predetermined acoustical signal to said acoustic projector in response to a control signal;

a second control means for outputting said control signal to said acoustic signal generator in response to an input signal; and an operator actuable input means for providing said input signal to said second control means in response to an operator's manipulation of said input means.

20. A system as claimed in claim 19, said input means comprising:

a keyboard, the depression of keys of said keyboard being representative of instructions to be performed by said second control means;

a plurality of push button switches, the depression of each one of said plurality of push button switches being representative of an instruction to be performed by said second control means;

a keyboard decoder for receiving said instructions from said keyboard and said plurality of push button switches, said keyboard decoder providing said input signal to said second control means in response to said instructions.

21. A system as claimed in claim 19, further comprising an audio amplifier for receiving said predetermined acoustical signal from said acoustic signal generator and amplifying it before providing it to said acoustic projector.

22. A system as claimed in claim 19, wherein said acoustic projector is a piston type acoustic projector.

23. A system as claimed in claim 19, wherein said acoustic projector is a piezoelectric type acoustic projector.

24. A system as claimed in claim 21, further comprising:

a test cable for operatively connecting said transmitter portion and said receiver portion; and a comparator for comparing the level of said ignition signal from said receiving means with a reference signal level and outputting the comparison results to said second control means.

25. A system as claimed in claim 24, further comprising a display driven by said second control means for displaying said comparison results.

26. A system as claimed in claim 25, wherein said receiver portion is fitted into the interior of a chain link of a mooring chain.

27. A separable link for use in separably connecting two lengths of chain each having a multiplicity of interconnected links configured to be moved through a restricted chain handling mechanism, said separable link comprising:

a plurality of removable interconnected parts operable when interconnected to interengage with adjacent end links of the two lengths of chain;

fastener means for operably retaining said parts in interconnected relation in interengagement with the adjacent end links, explosive means within said fastener means operable to be detonated so as to separate said fastener means, the parts of said separable link and hence the two lengths of chain;

miniaturized acoustical receiver means for receiving a transmitted acoustical detonation signal and causing said explosive means to detonate;

said fastener means, said explosive means and said miniaturized acoustical receiver means being mounted on said parts such that when said parts are retained in interconnected relation as aforesaid the separable link is shaped to be moved through the restricted chain handling mechanism with the links of the two lengths of chain.

* * * * *